Dec. 2, 1952
J. R. DOWNING
2,619,836
AIR-SPEED INDICATOR
Filed May 13, 1948
6 Sheets-Sheet 1
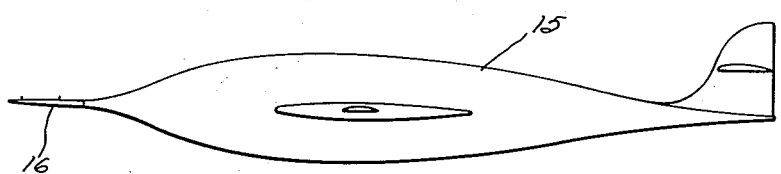
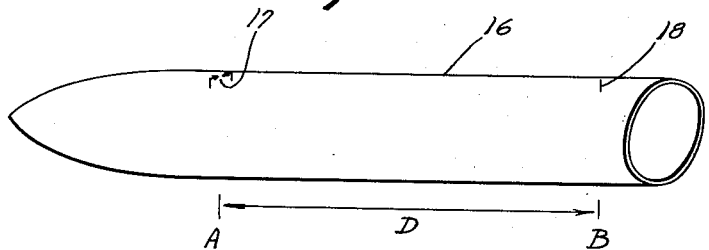
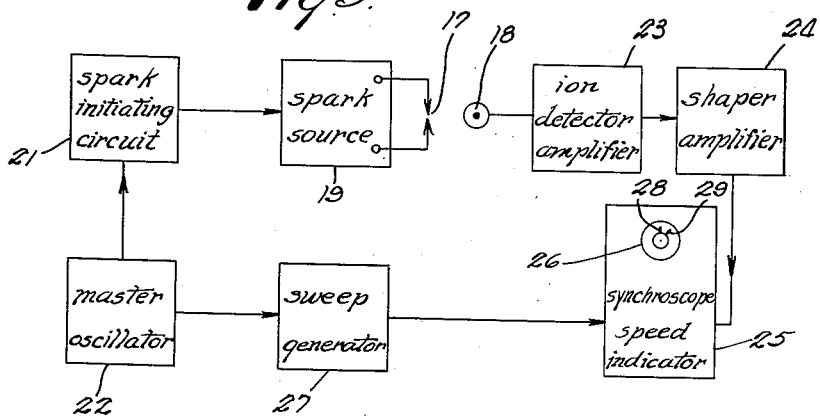
INVENTOR.
James Robert Downing

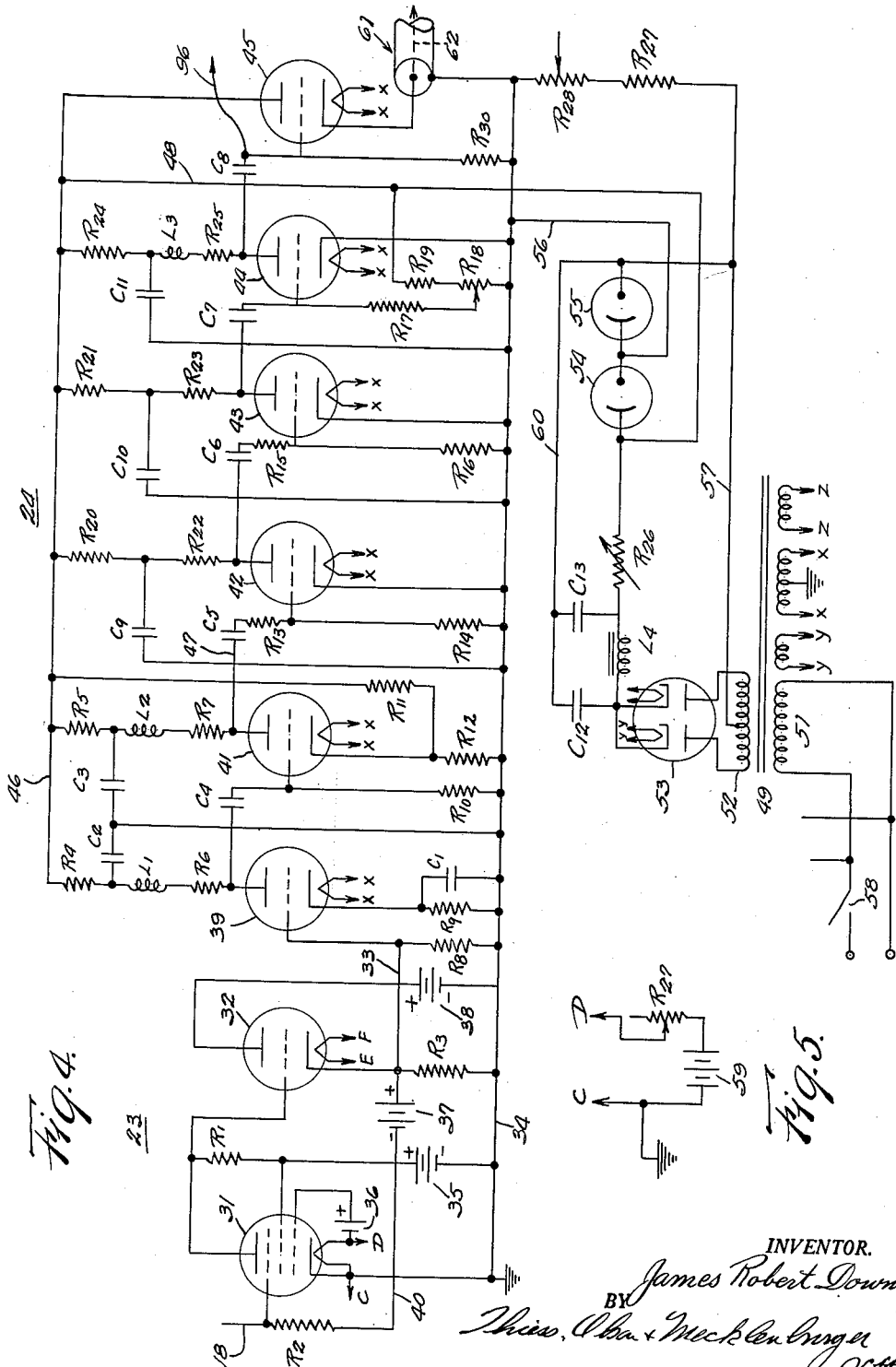

Dec. 2, 1952  J. R. DOWNING  2,619,836
AIR-SPEED INDICATOR
Filed May 13, 1948  6 Sheets-Sheet 4

INVENTOR.
James Robert Downing.
BY
Thiess, Olsen & Mecklenburger.
Attys.

Dec. 2, 1952  J. R. DOWNING  2,619,836
AIR-SPEED INDICATOR
Filed May 13, 1948  6 Sheets-Sheet 5

INVENTOR.
James Robert Downing
BY
Thiess, Olson & Mecklenburger.
Atty's.

Dec. 2, 1952   J. R. DOWNING   2,619,836
AIR-SPEED INDICATOR
Filed May 13, 1948   6 Sheets-Sheet 6
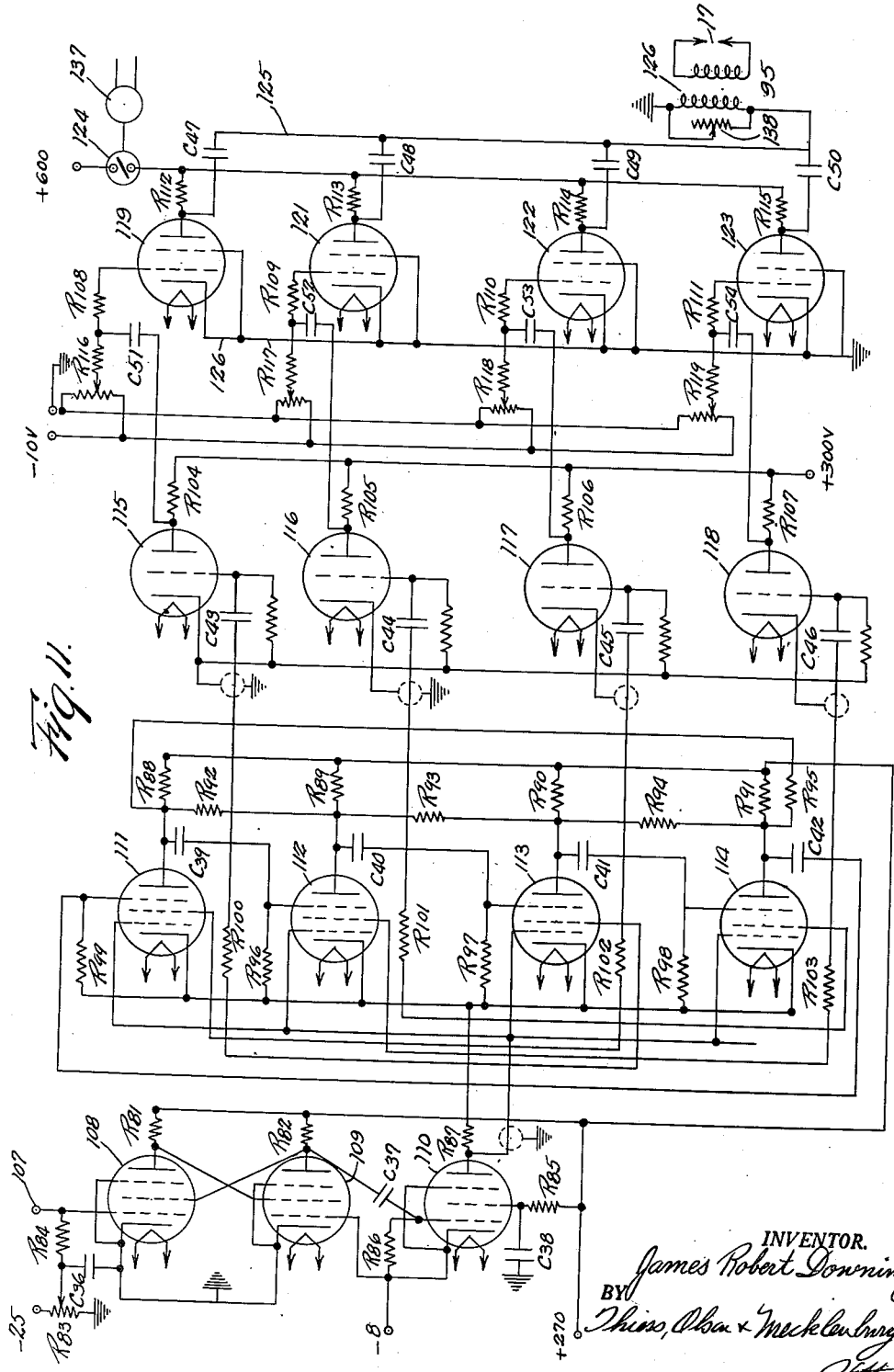
INVENTOR.
James Robert Downing
BY
Thiess, Olson & Mecklenburger
Pettys Patented Dec. 2, 1952

2,619,836

UNITED STATES PATENT OFFICE 2,619,836

AIR-SPEED INDICATOR

James Robert Downing, Chicago, Ill., assignor to Cook Electric Company, Chicago, Ill., a corporation of Illinois Application May 13, 1948, Serial No. 26,826

3 Claims. (Cl. 73—194)

This invention relates to apparatus for determining the velocities of moving bodies, such as airplanes and guided missiles, through a medium such as air in the sub-sonic, trans-sonic and super-sonic regions, and it is an object of the invention to provide improved apparatus of this character.

The velocity of a body through a medium is defined as the ratio of distance traveled in the medium to the time necessary to travel that distance, the basic method of measuring velocity involving the determination of distance and time and indicating their ratio. Where suitable reference points are available, the velocity of a moving body may be easily determined, but where bodies are moving through air, for example, and it is desired to obtain the relative velocity between the body and the air, the basic method of determining velocity by measuring distance and time has heretofore been unavailing inasmuch as there has been no satisfactory method of obtaining a reference point stationary relative to the air. However, the relative velocity between the body and the air has been determined indirectly by using Pitot tube devices which translate the relative velocity into a static pressure which may be observed.

Pitot tubes and similar instruments depend for their operation upon having relatively steady state flow past the body. At velocities considerably below the sonic velocity (velocity of sound in air), instruments needing steady state flow for operation are satisfactory inasmuch as shock waves, turbulence and other effects incident to moving at sonic velocities are absent. However, at sonic velocities where such conditions prevail, Pitot tube instruments fail completely, and consequently are valueless for use on objects such as airplanes or rockets moving at speeds approaching, passing through, and above the velocity of sound in air.

Whether operating in the sub-sonic, trans-sonic, or super-sonic regions, the basic principle of measuring velocity by determining the ratio of distance and time is still applicable, and it is an object of the invention to provide an improved apparatus for creating an influence which is stationary relative to the air from a point on the moving body, detecting the presence of this influence at a second point on the body as it moves past the stationary influence, and measuring the time interval elapsed. The distance between the points of influence creation and detection being known, the velocity may be directly observed.

It is a further object of the invention to provide improved apparatus of the character indicated wherein a visual indication may be obtained for an observer on a moving body.

It is a further object of the invention to provide improved apparatus of the character indicated wherein an indication may be obtained for telemetric purposes.

In carrying out the invention in one form, there are provided, means for causing a spark in air between two electrodes on the moving body thereby leaving a residuary charge in the air which is stationary relative thereto, detector means spaced a known distance away from the spark gap for detecting the presence of said charge by induction as it moves by, a time base means for measuring the elapsed time between the passing of a spark and its detection by induction, and visual means for indicating the ratio of the distance between the spark gap and detector, and the elapsed time.

In carrying out the invention in another form, there are provided, means for creating a spark in air at a certain point on the moving body, together with means a known distance therefrom for detecting the presence of the charge left by the spark, and means for initiating a spark whenever the charge from the immediately preceding spark is detected. Consequently, the number of charges detected depends upon the number of charges initiated in an interval of time, that is, the frequency of detection is determined by the speed of the body. A frequency meter may be calibrated to indicate the speed which may be observed directly or transmitted by telemetric processes.

For a more complete understanding of the invention, reference should be had to the accompanying drawings in which:

Figure 1 is a side elevational view of an airplane including velocity measuring apparatus embodying the invention;

Fig. 2 is a fragmentary view on an enlarged scale of the airplane shown in Fig. 1;

Fig. 3 is a schematic diagram of apparatus embodying the invention;

Fig. 4 is a circuit diagram of the ion detector amplifier and shaper amplifier of Fig. 3;

Fig. 5 is a circuit diagram on a larger scale of a component of Fig. 4;

Fig. 11 is a circuit diagram of the spark source and the spark selector and harmonic suppressor of Fig. 9.

Figure 6:
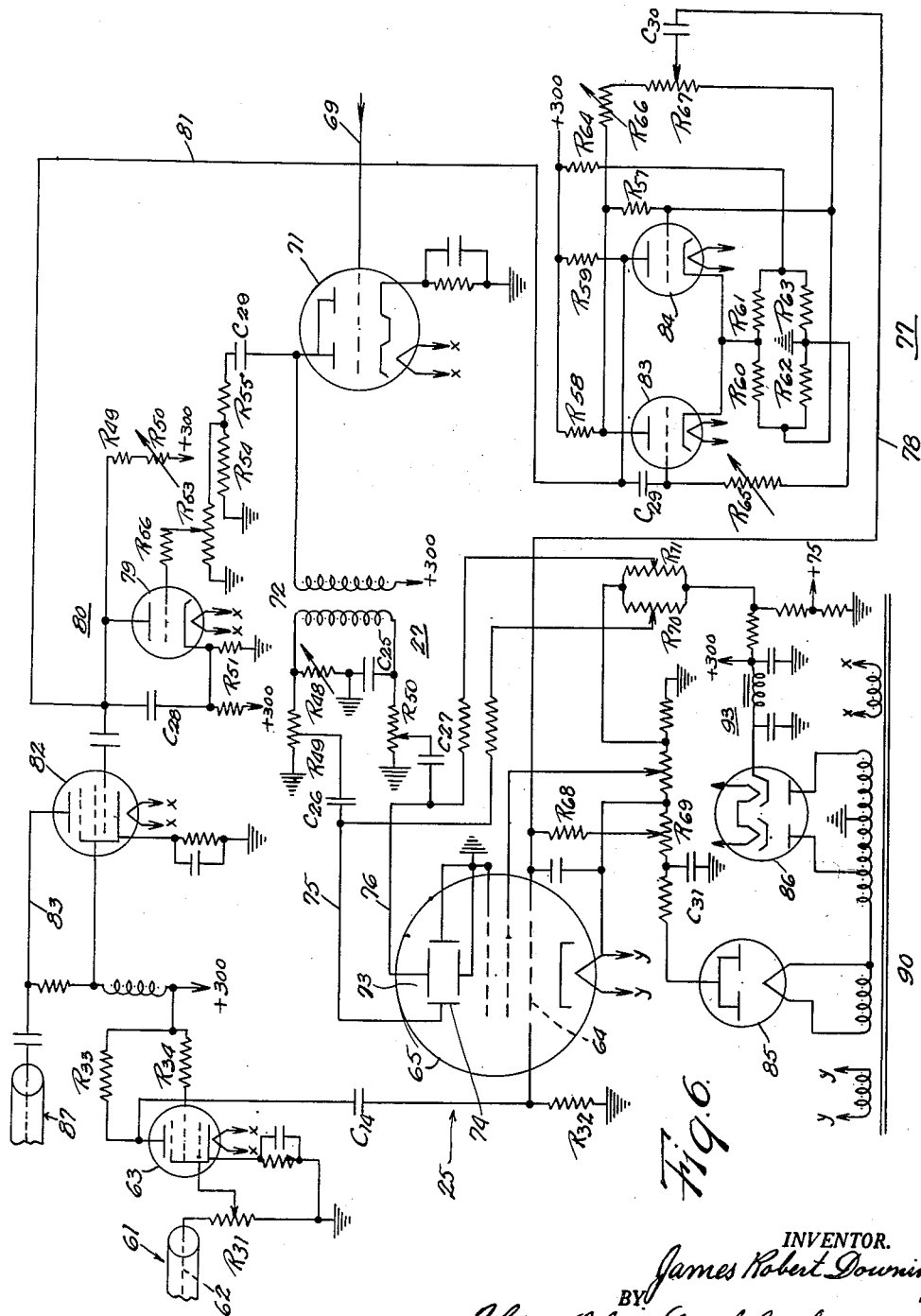
Fig. 6 is a circuit diagram of the synchroscope speed indicator and sweep generator of Fig. 3.

Referring to the drawings, the invention is shown embodied in an airplane 15 having a boom 16 disposed at the front end thereof upon which are mounted a spark gap 17 and a detector probe 18 separated from each other by a distance D. In the operation of the structure a high voltage spark is provided across the gap 17 which causes a corona discharge to take place at one point of the gap and subsequently causes the gap to break down completely. In either case the air in the gap becomes ionized and it has been determined that for a relatively short interval after the spark has occurred, a net charge remains in the air where the spark occurred. In general this net charge has seemed to be of a negative character, that is, a net amount of negative ions, although the invention is operative even though the net charge be positive.

The net charge created by a spark remains stationary relative to the air, and thus when detector probe 18 moves up to the point where the previous spark occurred it detects the presence of the net charge and thus provides a signal which may be used to produce an indication upon a suitable instrument. The passage of a spark across gap 17 may be detected by a direct connection from the spark gap or by electromagnetic radiation therefrom when a spark passes, thereby indicating the instant when the spark occurred. The net charge giving a stationary reference point in air, the detection of it by probe 18 giving an indication of the elapsed time between spark initiation and charge detection, and the distance between spark gap and detector being known, there are provided the necessary components for determining the velocity, that is, the ratio of distance to time.

The ions from the spark provide a charge stationary relative to the air inasmuch as the air molecules which are ionized are stationary relative to themselves, the spark gap itself being sufficiently small in its dimensions so as not to disturb the air surrounding it. For the charge in fact to be stationary relative to the air, it must occur sufficiently far ahead of the main body so that the air where the spark occurs is undisturbed. For bodies moving at sonic velocities or above, the distance to a point ahead of the body where the air is undisturbed is small, and thus boom 16 need not project far ahead of the airplane, for example not more than six inches or a foot. The boom is of small diameter not over about one and one-quarter inches. Likewise at velocities below sonic where the air is moving in a streamlined pattern, the distance ahead of the body to relatively undisturbed air while larger than for sonic velocities is also small. Boom 16, while shown on the fuselage of the airplane, may of course be disposed on any of the other surfaces, for example the wings, if so desired.

The ions remaining after the spark tend to diffuse into the surrounding air, thus spreading out the pattern thereof. Errors in speed measurement may occur because of this face, but these may be much reduced by having a spark of extremely short duration, for example, less than one microsecond. However, the time necessary for boom 16 to travel the distance D, which for example may be one foot, is very small and thus the time for spreading out of the ion charge is very small and may be largely neglected at speeds above about 200 miles per hour.

It has been determined that it is not necessary to collect the ions remaining after a spark, but a signal may be obtained therefrom by static induction by a probe or other sensing member moving past the immediate area where the ions exist. Thus, the probe need not be placed so as to be directly in the path of the charge, but may be placed off to one side a short distance and the probe may be an insulated button flush with the skin of boom 16, thereby eliminating any interference which the detector may have on the air flow characteristics. A signal is obtained by the probe moving into the outer fringes of the ion charge, the signal becoming stronger as the probe moves toward the center of the charge. In order to obtain an accurate indication of the velocity, circuits are provided whereby the signal is selected about at the same level of intensity irrespective of the speed.

In Fig. 3 the apparatus embodying the invention is shown in a single line block diagram. As shown in this diagram, a spark from a spark source 19 is provided across spark gap 17 after initiation thereof by a spark initiating circuit 21, the spark initiating circuit being set into operation from a master oscillator 22 which provides a constant known frequency. The ion charge sensed or detected by probe 18 is amplified by a detector amplifier 23 and is passed through a shaper amplifier 24 to a synchroscope speed indicator 25, the shaper amplifier 24 shaping the pulse obtained from sensing the ion charge into a very sharp or peaked pulse to eliminate errors resulting from spreading out of the ion pattern and providing a suitable pulse to be supplied to the synchroscope. The synchroscope includes a rotating sweep or visible pattern upon a screen 26 obtained through a sweep generator 27, the period thereof or the time necessary to complete one revolution being determined by the frequency of the master oscillator. Thus the master oscillator controls the spark initiating circuit and also provides the time base for the synchroscope.

The passing of a spark across gap 17 of course sets up electromagnetic radiation which is picked up by probe 18, is amplified by the detector and shaper amplifiers, and is supplied to the synchroscope and appears on its screen as a voltage pulse 28 referred to as a spark pulse. Likewise, when probe 18 reaches the point where the previous spark has occurred, a second pulse 29 referred to as an ion charge pulse appears on the screen displaced from pulse 28 by an amount determined by the time necessary for probe 18 to travel the distance D. The frequency of the master oscillator may be so chosen that pulses 28 and 29 are separated by a distance which may be easily read in feet per second or any other units.

The detailed structure and circuits comprising the various components shown in Fig. 3, together with their more detailed operation, may now be described. Throughout this specification the letter C is used for condenser, the letter R is used for resistor, mf. is used for microfarad, mmf. is used for micromicrofarad, the letter K is used for 1,000 ohms, and the letter M means one million ohms.

In Fig. 4 detector probe 18, ion detector amplifier 23, and shaper amplifier 24, together with their power supply, is shown by way of circuit diagrams.

The ion detector amplifier comprises a pair of tubes 31 and 32 connected in feed-back relationship, the output signal therefrom being fed to the shaper amplifier through conductors 33 and 34, conductor 34 being a common connection and being grounded as shown.

Tube 31 is a type 954 tube and is a pentode of the type known as acorns. The plate voltage thereof is 6 volts of the polarity indicated supplied from a battery through a 250K resistor R1, the voltage of battery 35 being also supplied to the screen grid. The control grid is connected through a battery 36 of 3 volts to the cathode, the grid being positive relative thereto. Probe 18 is connected to the suppressor grid and is also connected through a 50M resistor R2 to the negative side of a battery 37, to the cathode of tube 32 and a 22K resistor R3 to ground.

The usual functions of the control and suppressor grids in tube 31 have been reversed, the signal from probe 18 being connected to the suppressor grid and the usual control grid being connected to the filament. These somewhat unusual connections, together with the application of only 6 volts to the plate and a positive 3 volts applied to the usual control grid, arise from the fact that the currents to be detected are extremely small, being in the order of $10^{-13}$ amperes. In detecting currents of this order of magnitude, space charge effects, grid current effects and secondary emission, for example, as well as other effects must be reduced to a minimum. It has been found that satisfactory operation is obtained when the signal is introduced into the suppressor grid and secondary emission effects from the filament are prevented from reaching the suppressor grid by the application of the 3 volts positive. With the connections shown, grid current has been reduced to the order of $10^{-15}$ amperes.

The output from the plate of tube 31 is fed into the grid of tube 32 which is a triode of type 9002 having an amplification factor of about 25, this tube being a miniature tube. Tube 32 is operated as a cathode follower with 22K R3 connected in the filament circuit and a battery 38 of 22½ volts connecting the plate thereof directly to ground. The voltage developed across R3 is about 6 volts positive which, combined with the voltage of battery 37, 9 volts negative, results in about 3 volts negative being applied to the suppressor grid of tube 31. The amplified signal from tube 32 is inversely fed back to tube 31 through conductor 40 in order further to reduce distortion, and to improve the transient response of the amplifier. R2 is very large, i. e. 50 megohms, and is so chosen relative to the interelectrode capacities of tube 31 also to improve the transient response.

Tube 32 also acts as an impedance matching device between the high plate impedance of tube 31 and the considerably lower impedance in the input of shaper amplifier 24.

The amplified current signal from ion detector amplifier 23 is fed through conductor 33 into the grid of tube 39 of the shaper amplifier which comprises a series of tubes 39, 41, 42, 43 and 44 connected in cascade, the output of which is further amplified by an isolating output amplifier tube 45. Tubes 39, 41, 42, 43 and 44 are twin triodes of type 6SN7 having amplification factors of about 38, the tubes being operated in the circuit shown with only one of the triode sections being used.

The shaper amplifier has two functions, those of amplifying the pulse received from the ion detector amplifier and to shape it into a more usable form for application to the speed indicating device. The signal received by probe 18 is in the form of a pulse of short duration but having a wave front which varies in slope depending upon the speed of the body through the air. At high speeds the wave front of the pulse is very sharp inasmuch as the ions have had less time to diffuse out of the pulse area and the movement thereby is rapid, whereas at relatively low speeds the wave front of the pulse tends to be flatter due to the diffusion of the ions and the rate of movement thereby is slower. For consistent indications of speed, it is necessary to obtain a signal from the pulse always at about the same slope or intensity level, this function being performed by the shaper amplifier.

Tubes 39 and 41 of the shaper amplifier operate largely as amplifiers and amplify the signal received from the ion detector amplifier to a point where the subsequent stages 42, 43 and 44 operate at saturation. The amplified signal from tube 39 is fed to the grid of tube 41 through condenser C4 of .01 microfarads. Plate voltage is applied to tubes 39 and 41 from conductor 46 through 22K resistors R4 and R5, one millihenry inductances L1 and L2, and 82K resistors R6 and R7, the voltage on conductor 46 being approximately 150 volts supplied from a power source to be described subsequently in this specification. The grid of tube 39 is also connected through a 1M resistor R8 to ground, and the filament is connected through a 2.7K resistor R9 and a .005 mf. condenser C1 to ground. The grid of tube 41 is connected to ground through a 1M resistor R10, and the filament is connected through a 47K resistor R11 to conductor 46 and through a 270 ohm resistor R12 to ground. Condensers C2 and C3 of 30 microfarads are connected from the upper ends of L1 and L2 and from their junction to ground. The combination of inductances, resistors, and condensers connected to the plates of tubes 39 and 41 function to suppress transients from the power supply, to improve the frequency response of the amplifiers and to prevent feed-back through the power supply circuit.

Tubes 42 and 43 and their associated circuit components are clipping stages in which the signal supplied from the plate of tube 41 to the grid of tube 42 is formed into a pulse having a sharp rise, a sharp decrease with a relatively constant portion in between, two clipping stages being required inasmuch as the pulse picked up by induction from the ion charge has both a positive and a negative portion. Tubes 42 and 43 function as clippers inasmuch as their respective grids are driven positive by the signal supplied thereto whereupon grid current flows and the plate current becomes constant, as is well understood. Inasmuch as the signal from plate of tube 41 is highly amplified, the grid of tube 42 is driven positive as the condenser C5 charges, and since C5 is small, that is .01 microfarad, it charges very rapidly, resistor R13 having a value of 100,000 ohms and the resistor R14 connecting the grid of tube 42 to ground having a value of 3.3 megohms. Since condenser C5 charges rapidly, the pulse from the plate of tube 42 and fed to condenser C6 has a much sharper wave front than the pulse fed to C5. The output of tube 42 is fed through C6 of .01 microfarad and 100M resistor R15 to the grid of tube 43 which is also connected to ground through a 3.3M resistor R16. Since C6 is also small, the wave front of the pulse from the plate of tube 43 and applied to condenser C7 has a still sharper wave front than that of the pulse at the plate of tube 42. C5 and C6 also discharge rapidly when the voltage thereacross decreases, whereby both the rising and falling portions of the pulses are very sharp, although the time elapsed therebetween is a substantial portion of the total cycle.

The signal from plate of tube 43 is applied to condenser C7 and directly to the grid of tube 44 without the use of a resistor. C7 has a capacity value of 10 micromicrofarads and thus charges extremely rapidly whereby the voltage applied to the grid of tube 44 rises very rapidly virtually at the instant of voltage application, thereby giving a very sharp peak. C7 also discharges rapidly when the voltage thereacross decreases, thereby giving a second sharp peak of opposite sign to the first. The grid bias of tube 44 through a 100K resistor R17 and variable resistor R18 having a maximum value of 70,000 ohms may be varied so that the clipping taking place in tube 44 may be controlled. Inasmuch as one of the pulses applied to the grid of tube 44 drives the grid positive, a clipping will occur and one of the peaks is eliminated, leaving only the pulse which occurs in the same direction as the pulse due to a spark jumping across points 17. The grid bias circuit of tube 44 is completed through a resistor R19 connected to conductor 48 leading to the power supply, as will be described subsequently in this specification. The pulse from tube 44 is supplied through a condenser C8 of .01 mf. to tube 45 connected as a cathode follower for preventing the application of load to the pulse shaper tubes and thus preventing attenuation therein. The grid of tube 45 is connected to ground through a 100,000 ohm resistor R30.

The filaments of tubes 42, 43 and 44 are connected to ground and plate voltage is supplied to tubes 42 and 43 from conductor 46 through 5.6K resistors R20 and R21, and 4.4K ohm resistors R22 and R23. The junction of R20 and R22 is connected to ground through 30 mf. condenser C9, and likewise the junction of R21 and R23 is connected to ground through a 30 mf. condenser C10.

Plate voltage is supplied to tube 44 from conductor 46 through a 22K resistor R24, a one millihenry inductance L3, and an 8.2K resistor R25, the junction between R24 and L3 being connected to ground through a 30 mf. condenser C11. The various coupling resistors and condensers associated with the plate circuits of tubes 42, 43 and 44 form in part, together with the plate circuits of tubes 39 and 41, de-coupling means whereby feed back to amplifiers 39 and 41 through the common power circuit is eliminated.

Plate voltage is supplied to the tubes of the shaper amplifier from a power supply including transformer 49 having primary and secondary windings 51 and 52, the primary winding being connected to a full wave rectifier 53 of the type 5R4GY. The filaments of the rectifier are connected together into a filter network including an inductance L4 of 10 henrys, and condensers C12 and C13 of 4 microfarads and 8 microfarads respectively, and through a variable resistor R26 of 10,000 ohms and voltage regulator tubes 54 and 55 which may be of the gas filled type such as VR150-30 having an operating voltage of 150 volts. The mid-point of tubes 54 and 55 is connected through conductor 56 to ground, and the plate of tube 54 is connected through conductor 48 to conductor 46 for supplying 150 volts positive to the various tubes of the shaper amplifier. The rectification circuit is completed to the center of secondary winding 52 through a conductor 57 connected to the cathode of tube 55 and conductor 60 to C12 and C13. Thus conductor 57 may have a negative voltage of 150 volts supplied to it, resistor R26 providing some adjustment in the voltages available from the power supply. Conductor 57 is connected to ground through resistors R27 and R28 having values respectively of 47,000 ohms and 4,000 ohms for a purpose to be described subsequently. Forming part of transformer 29 are various filament supply sections for supplying filament voltages to the various tubes, the filaments designated X—X taking 6.3 volts from the corresponding transformer section. Transformer 49 may be supplied with any desired voltage through a switch 58, such for example as 110 volts of any frequency between 60 and 400 cycles per second.

The filament supply for tube 31 is shown in Fig. 5 and comprises a battery 59 of 6 volts and a variable resistor R29 of 500 ohms. Similarly the filament of tube 32 may be a battery of 6.3 volts without adjustment.

The application of the signal, after proper shaping, to the synchroscope tube 65 may best be understood by considering Figs. 4 and 6 together.

The shaper amplifier 24 and the amplification stage 32 of the ion detector amplifier may be designed as a unit together with some other components of the system, and the synchroscope speed indicator may be designed as a unit inasmuch as these units in operation may be separated from each other depending upon the space requirements available. Accordingly, the output signal from amplifier 45 may have to be transmitted some distance before being applied to the synchroscope and for this purpose the coaxial cable 61 is provided, the outer conductor of which being grounded as shown in Fig. 4 and the central conductor 62 of which is connected to the filament of tube 45 which may be a triode of the type 6J5. The other end of conductor 62 is connected through a 1K resistor R31 to ground, R31 constituting a cathode follower resistor for tube 45, it being noted that the output voltage of voltage regulator tube 54 is applied directly to the plate of tube 45.

When the synchroscope indicator and the shaper amplifier are separated and a coaxial connecting cable is used, the cathode follower type of amplifier is desirable to match the plate impedance of the tube 45 to the relatively low impedance of the coaxial cable.

As part of the synchroscope speed indicator there is an amplifier tube 63 which may be a pentode of the type 6AC7 whose control grid is supplied with a voltage from R31. In installations where the shaper amplifier circuit and the synchroscope tube may be mounted in the same unit, the amplifier 45 may be eliminated inasmuch as the coaxial cable 61 would be eliminated, there being consequently no need for impedance matching.

The voltage signal from shaper amplifier 24 after being amplified by tube 63 is fed to the deflector grid 64 of synchroscope tube 65 through a condenser C14 which forms a blocking condenser for direct current voltages, the deflector grid 64 being connected to ground by a resistor R32 as shown. Tube 63 is connected in normal fashion and a voltage of 300 volts is applied to both the plate and the screen grid through resistors R33 and R34. The output signal from amplifier 63 applied to deflector grid 64 produces a "pip" or jump on the sensitive screen 26 (Fig. 3) of the synchroscope tube. Two "pips" are of course obtained, one when the spark jumps across spark gap 17 and the second when the ion impulse therefrom is detected, the displacement between these two being a measure of the elapsed time therebetween.

Operation of synchroscope tube 65 (component 25 of Fig. 3) which may be of the type 1808 and its supply circuits may now be described.

Figure 8:
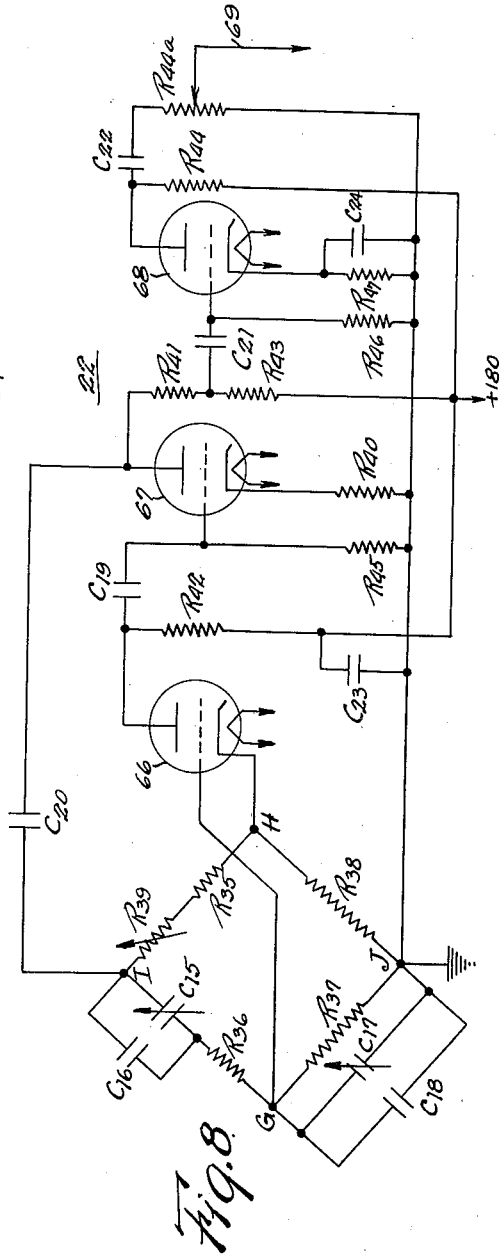
Fig. 8 is a circuit diagram of the master oscillator of Fig. 3.

The oscillator for supplying the basic frequency of the system, that is the master oscillator 22 of Fig. 3, is shown in Fig. 8 as being of the Wien bridge type generating a sinusoidal basic frequency of 1,000 cycles per second. This circuit is a well understood one and it is not believed to be necessary to give a detailed explanation thereof. The frequency of the oscillator is determined by the constants of the bridge network which comprises the fixed resistors R35, R36, R37 and R38 having values, respectively, of 25K, 175K, 175K and 1.1K, and variable resistor R39 having a value of 500 ohms. These resistors are connected as shown and between R39 and R36 there is a variable condenser C15 of 10 to 50 micromicrofarads, and a fixed condenser C16 of .001 micromicrofarads. Connected across R37 are a variable condenser C17 of 10 to 50 micromicrofarads and a fixed condenser C18 of 100 micromicrofarads.

The output of the bridge across points G and H is applied across the filament and grid of a triode 66 which may be of the type 9002 operating as a buffer or isolating amplifier so as to prevent subsequent elements from applying load to the bridge circuit. The plate of tube 66 is connected through a .01 mf. condenser C19 to the grid of an amplifying tube 67, also of the type 9002, the plate thereof being connected through a feed-back circuit including the condenser C20 of .01 mf. to point I of the bridge, the opposite point J thereof being grounded as shown and connected through a 22K resistor R40 to the filament of tube 67 for completing the feed-back circuit. The plate of tube 67 is connected through a 100K resistor R41 and a .0015 mf. condenser C21 to the grid of tube 68, also of type 9002. Plate voltage is supplied to each of tubes 66, 67 and 68 from a D. C. voltage source of approximately 180 volts through resistors R42, R41 and R43 and R44. R42 has a value of 47K, R43 has a value of 68K, and R44 has a value of 22K.

The output of amplifier 68 is taken from a 1M resistor R44a through a .01 mf. condenser C22. R42 is connected to ground through C23 of 1 mf., the grid of tube 67 is connected to ground through R45 of 470K, the grid of tube 68 is connected to ground through R46 of 68K, and the filament of tube 68 is connected to ground through R47 of 4K and C24 of .01 mf.

The form of Wien bridge amplifier shown is exemplary, as it will be understood by those skilled in the art that other forms thereof may be used as well as other types of oscillators, the one illustrated having been found to be satisfactory.

The operation of the Wien bridge oscillator in connection with the synchroscope indicator may best be understood by considering Figs. 3, 4 and 8 together.

The 1,000 cycle output of the oscillator is led through a conductor 69 to an amplifier 71 (Fig. 6) which may be of the double triode type such as a 6SN7 tube with the filaments connected together and the plates connected together and to a 300 volt D. C. plate supply. The amplified output of tube 71 is applied through a phase shifting network including a transformer 72 to the vertical deflecting plates 73 and the horizontal deflecting plates 74 of the synchroscope indicator, the phase shifting network and the frequency supplied thereto being designated as the sweep generator 27.

The phase shifting network on the secondary side of transformer 72 includes a variable 250K resistor R48 and a fixed .01 mf. condenser C25, the junction between these two members being grounded as shown. The phase shifted voltages are tapped off of 1M resistors R49 and R50 through blocking condensers C26 and C27 and conductors 75 and 76 to deflecting plates 73 and 74. The sinusoidal voltages applied to deflecting plates 73 and 74 may be adjusted to be 90° out of phase, and since they are equal in value a circular sweep pattern will be observed on the sensitive screen 26 (Fig. 3) of synchroscope tube 65 having a frequency of 1,000 cycles per second (i. e. 1,000 revolutions per second), a cathode ray or beam being provided within the tube as is well understood.

It will now be apparent that when the spark and ion charge pulses are applied to deflecting grid 64 of the synchroscope tube from the shaper amplifier, the circular sweep in the synchroscope screen will appear to have a pair of "pips" angularly displaced relative to each other. Deflecting grid 64 may also be a sensitizing grid placed on the sensitive surface of the tube and may be constructed to function similarly to a deflecting plate.

It has been found that producing 100 sparks per second results in satisfactory operation for producing speed indication.

Accordingly, a frequency divider circuit or relaxation oscillator 80 may be synchronized to lock in with the 1,000 cycle frequency of a master oscillator on the tenth subharmonic so as to form a frequency of 100 cycles per second for initiating operation of the spark circuit, as will be described subsequently in this specification.

Since both the spark pulse and the ion charge pulse must be received during a single revolution of a sweep in order to have an accurate indication of speed, it is unnecessary to have the sweep above the visible threshold value at all times. It is difficult to have the sweep follow the same pattern on each revolution for many revolutions, but it is a relatively simple matter to have the circular sweep follow the same pathway two successive revolutions above the visible threshold value. Accordingly, the initiation of a spark by the relaxation oscillator may also be used to cause intensification of the synchroscope viewing screen 26 for a period of two revolutions thereof or for 2,000 microseconds. For the remaining 8,000 microseconds between .01 second intervals the visual screen of the synchroscope screen may be below threshold value and thus invisible.

The foregoing is accomplished in the following manner.

A one-shot multi-vibrator circuit 77 is triggered by relaxation oscillator 80 at the same time a spark is caused to jump by the relaxation oscillator, the one-shot multi-vibrator being effective through a conductor 78 to apply a square top voltage to the deflection grid 64 of the synchroscope tube, which deflection grid of type 1808 synchroscope is also the intensifier grid. Thus, at the instant a spark is caused to jump. the sweep on the synchroscope screen becomes suddenly visible together with a "pip" from the spark and remains visible for two revolutions or 2,000 microseconds, after which it becomes invisible for eight revolutions or 8,000 microseconds until another spark is caused to pass.

The relaxation oscillator for producing 100 cycles per second from the basic 1,000 cycles per second comprises a tube 79 which may be of the type 884 across the filament and a plate of which a .06 mf. condenser C28 is connected as shown. The plate of tube 79 is connected through a 1M resistor R49 and a variable 252K resistor R50 to a positive 300 D. C. volts. The other end of C28 is connected to the filament of tube 79 and through a 1.2K resistor R51 to ground. Tube 79 is of the gas type having a control grid which is connected through a 10K resistor R56 and a voltage divider circuit including the resistors R53, R54 and R55, and blocking condenser C29 of .01 mf. to the plate of tube 71. R53 and R54 are connected to ground. The voltage applied to the grid of tube 79 may be so adjusted that the tube becomes conducting when a certain voltage is reached across the filament and plate. C28 will charge up through a circuit including R51, R49 and R50, and when a certain voltage is reached across C28 tube 79 will break down due to the proper voltage being on the grid at that instant from the master oscillator, thereby discharging the condenser after which the discharge through the tube stops and condenser C28 charges again. C28 and the various resistors combine to produce a frequency of about 100 cycles per second so that the oscillator locks in at that frequency with the 1,000 cycle basic frequency in a manner as is well understood.

The 100 cycle per second pulses from the relaxation oscillator are supplied through conductor 81 to one-shot multi-vibrator 77 for causing intensification of the synchroscope screen and to the isolation amplifier 82 and through conductor 83 for initiating a spark. Consequently, the synchroscope screen is intensified so that the visual sweep is obtained at the same time that the jumping of the spark is initiated.

The one-shot multi-vibrator 77 is a well known circuit and comprises two tubes 83 and 84 which may be double triodes of the type 6SN7 only one-half of which is used, the plate of tube 84 being connected through a .005 mf. condenser C29 to the grid of tube 83, and the plate of tube 83 being connected through a 680K resistor R57 to the grid of tube 84. A positive 300 volts D. C. is applied to the plates of the tubes through 150K and 220K resistors R58 and R59, respectively. The filaments of tubes 83 and 84 are connected together and through a network as shown of resistors R60, R61, R62 and R63 having respectively values of 16K, 5.6K, 30K and 5.9K, the junction of R61 and R63 being connected through a 150K resistor R64 to positive 300 volts D. C. A variable 250K resistor R65 is connected from the grid of tube 83 to ground, as shown, and may be varied to determine the microsecond duration of the square top voltage put out by the multi-vibrator and thereby determine the duration of synchroscope screen intensification. The output of the multi-vibrator is taken through a variable 2M resistor R66, through a tapped portion of a 100K resistor R67, and through a .06 mf. condenser C30. Varying the value of R6 determines the magnitude of the intensification.

The normal intensity level of intensifier grid 64 is maintained just below the visible threshold by a voltage applied thereto through a resistor R68 tapped on to a resistor R69 of 1500 ohms, the voltage thereacross being obtained from a rectifier tube 85 which is supplied with approximately 800 volts alternating current from transformer 90. Rectifier 85 may be of a type known as 5Y3 but connected to operate as a half-wave rectifier, a 1 mf. condenser C31 being connected in the output circuit as shown to smooth out the voltage.

The 300 volt positive D. C. voltage applied to the various tubes is obtained from a tube 86 connected as a full wave rectifier, the tube being of the high vacuum tube 6X5. The output of the rectifier is connected through a pair of condensers and an inductance as shown, providing a filter network 93 following which the 300 volts necessary for the various circuits is obtained. A pair of 1M resistors R70 and R71 are connected in parallel across the voltage divider circuits from rectifiers 85 and 86, varying portions of R70 and R71 being tapped off and connected to conductors 75 and 76 for supplying a stabilizing effect to the horizontal and vertical deflecting plates of the synchroscope tube.

Figure 7:
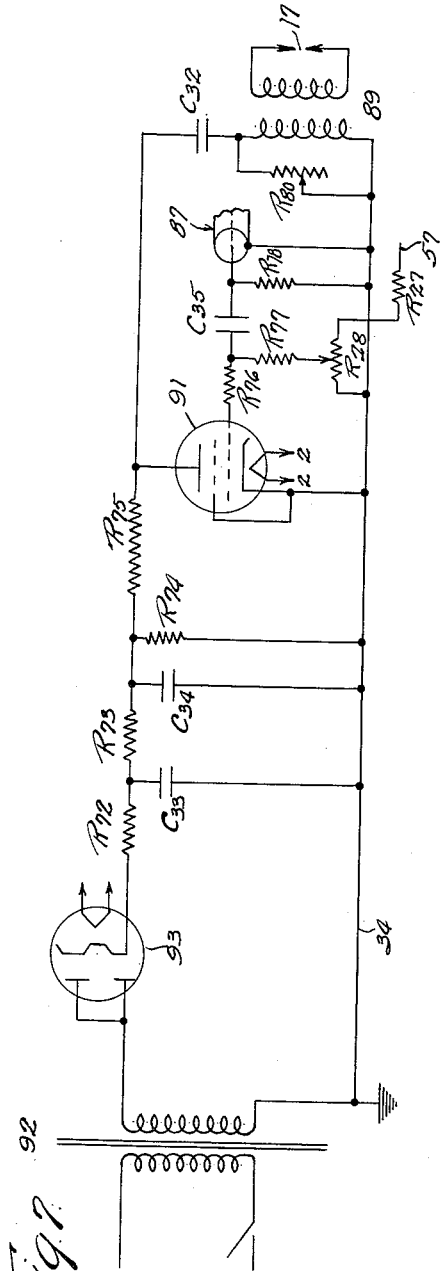
Fig. 7 is a circuit diagram of the spark source, and the spark initiating circuit of Fig. 3.

The operation of the relaxation oscillator to initiate a spark may be best understood by considering Fig. 6 in connection with Fig. 7 (showing the spark initiating circuit 21 and the spark source 19 combined).

A spark is caused to jump across gap 17 by the discharge of a condenser C32 through the primary winding of the transformer 89 and a mercury vapor tube 91, the tube 91 being made conducting by the voltage pulses from the relaxation oscillator through isolation amplifier 82 and co-axial cable 87. The isolation amplifier prevents the conduction of tube 91 from placing a load upon the relaxation oscillator and thus influences its frequency, the isolation amplifier being a pentode tube of the type 6AC7 having 300 volts applied to the plate thereof as shown.

Referring particularly to Fig. 7, condenser C32 which may have a capacity of .05 mf. is charged up from a circuit including the secondary winding of transformer 92, and a rectifier tube 93 which may be of the type 6X5 operating as a half wave rectifier. The output of the rectifier is connected through resistors R72 and R73 of values 100 and 1000 ohms respectively, and through condensers C33 and C34 of 8 mf. each to ground and conductor as shown. R72, R73 and C33 and C34 operate as a filter and supply a D. C. voltage across the resistor R74 which may be 200K, the voltage across R74 being supplied through a regulating resistor R75 of 50K to the plate of tube 91 and to C32.

Tube 91 is of the type known as a 2D21 which is a four-element mercury vapor tube. The control grid thereof is connected through resistors R76 and R77 of 100,000 ohms each and tapped to resistor R28 (see also Fig. 1). Through these resistors the normal bias voltage is applied to the grid so that the tube does not conduct. With the control grid adjusted to a normal voltage, C32 may be charged to a desired voltage, for example approximately 400 volts, without having the tube 91 become conducting. Charging C32 through the primary winding of transformer 89 takes place relatively slowly so that no spark occurs across gap 17. When C32 is fully charged and a voltage pulse is received from the relaxation amplifier over co-axial cable 87 and applied to the control grid of the tube 91 through a .01 mf. condenser C35, tube 91 becomes conducting and C32 discharges through the primary winding of the transformer and tube 91. The center conductor of the coaxial cable is grounded through 10K resistor R78. This discharge takes place in a very short time interval, for example less than 1 microsecond with a consequent high voltage spark across gap 17. Gap 17 may be one-sixteenth of an inch across. The voltage developed is considerably higher than that necessary to merely break down the gap so that it is assured that a spark will always jump. When C32 discharges through tube 91, the plate voltage of the tube drops to a very low value so that the voltage applied to the plate through R75 is insufficient to maintain the tube conducting. Consequently, the tube becomes non-conducting and C32 may start to charge again for repeating the cycle of operation.

For suppressing transients in the spark circuit a 1K resistor R80 is connected across the primary of transformer 89.

Filament voltages for the various tubes may be supplied from the transformers as is well understood.

In cases where the detector and shaper amplifiers and the synchroscope with its attendant circuits are mounted in one unit, the cable 61 may be eliminated together with the impedance matching amplifier 45 and its cathode follower resistor R31. In this instance the output of tube 44 may be connected by a conductor 96 directly to the grid of tube 63.

While various tubes and circuit constants have been shown, it will be understood that other tubes and constants may be used without departing from the spirit and scope of the invention.

With the structure as described, the integrated operation thereof may be summarized.

The master oscillator 22 operating at a basic frequency of 1,000 cycles per second produces synchronism for the entire air speed indicator. The sinusoidal voltage output of this oscillator is amplified and applied to the horizontal and vertical deflecting plates of synchroscope tube 65 through a phase shifting network such that a circular sweep is obtained. Thus the time base of the indicator is directly established from the master oscillator.

A second signal is taken from the master oscillator to trigger a relaxation oscillator 80 which is synchronized to lock in at 100 cycles per second, the relaxation oscillator supplying signals to two circuits.

One circuit receiving the 100 cycles per second signal is the one-shot multi-vibrator 77 which is adjusted to provide a square wave having a duration of 2,000 microseconds during the positive half of its cycle of operation (two revolutions of the sweep circuit). This square wave is applied to the intensifier grid of the synchroscope tube, which grid is maintained just below the visible threshold value prior to the receipt of the positive intensifier pulse. Therefore, during the 2,000 micro-second interval the sweep is intensified, allowing two complete circular sweeps to appear on the synchroscope screen. For the remaining 8,000 microsecond period the intensity is below the visible threshold.

A second circuit receiving the 100 cycle per second pulses is the spark initiating circuit 21. When the sparking circuit is triggered by this pulse, it produces a new pulse of very high voltage which is applied to the spark gap. The spark gap breaks down and introduces an ion signal into the air stream passing between the gap electrodes. At the same time it sends a signal through the amplifiers to the synchroscope tube which appears on the screen thereof as a pulse 28 which may be adjusted to appear at any origin. The ion signal is carried down stream past the ion detector which is located at a fixed distance D from the spark gap. The ion detector detects the presence of the ions in the form of a voltage pulse of small amplitude. This pulse is then amplified and shaped into a narrower pulse which is applied to the deflecting grid (also the intensifier grid) of the synchroscope indicator tube. This pulse appears on the circular sweep at some time later than the spark pulse, this time interval being determined by the distance D between the spark gap and the detector and the speed of the air. The indicated time interval will be slightly larger than the actual transit time of the ions between the spark gap and the detector due to the error introduced by shaping the pulse. However, at high velocities where the leading edge of the detected pulse is much steeper, little or no error is introduced by the shaping circuit and hence the indicated time is essentially the same as the transit time.

Since the sweep has a known time duration it is possible to calibrate the angular displacement of the "pips" on the screen in units of time or velocity as desired. The velocity can be calculated in feet per second by the formula:

$$v = \text{ft./sec.} = D/t = \frac{\text{spark gap to detector spacing}}{\text{transit time}}$$

The spark gap detector spacing being expressed in feet, and the transit time being expressed in seconds, the angular displacement of the synchroscope screen may be calibrated in feet per second of true air speed.

Figure 9:
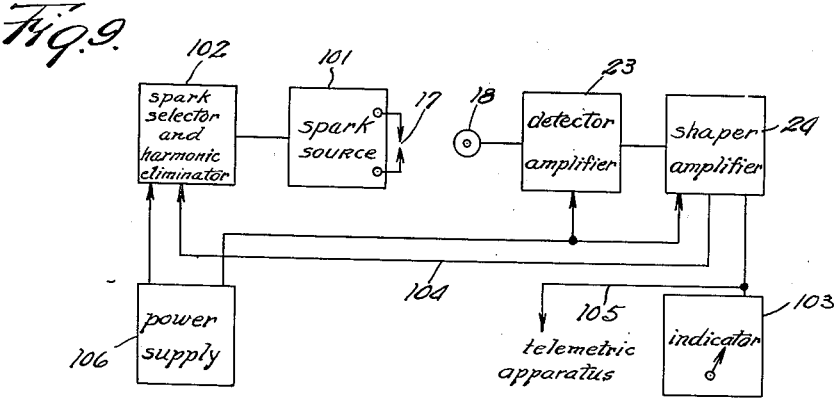
Fig. 9 is a schematic diagram of a modified form of the invention.

Referring to Fig. 9, apparatus embodying the invention for obtaining a speed indication in terms of the frequency of ion charge detection is shown in a single line block diagram. By virtue of this apparatus a pointer type of instrument may be used and the signal may be transmitted by telemetering apparatus. Spark gap 17, detector probe or sensing device 18, detector amplifier 23, and shaper amplifier 24 may be identical with corresponding units already described.

In the operation of this structure a spark across gap 17, the energy for which is provided from a spark source 101 after initiation thereof by a spark selector and harmonic eliminator 102, produces a pulse of electromagnetic radiation which is sensed by probe 18, amplified through detector and shaper amplifiers, and provided to the indicator 103, the amplification of this signal through the detector and shaper amplifiers being as already described. When probe 18 reaches the point where the previous spark has occurred, a signal pulse is obtained as already described, is amplified and shaped in detector and shaper amplifiers, and is transmitted to indicator 103. This pulse is also transmitted to spark selector and harmonic eliminator 102 through a circuit indicated diagrammatically by conductor 104 and thus initiates a second spark across gap 17. The electromagnetic radiation from this second spark is, of course, received immediately and applied to the indicator substantially simultaneously with the detection of the ion charge which gave rise to the spark. The second spark also leaves an ion charge which is detected by probe 18 when it comes into the ion charge area, and thus provides a signal which passes to the indicator and to the spark selector and harmonic eliminator through conductor 104 thereby initiating a third spark.

Accordingly, each time an ion charge is sensed by probe 18, a spark is initiated ahead of the probe which leaves an ion charge subsequently detected by probe 18 as it comes into the ion charge area thereby initiating a new spark ahead of the probe. Consequently, the number of ion charges detected by probe 18 is a direct function of the object's speed and thus the number of pulses received per second or the frequency thereof is a measure of the object's speed. If the distance between spark gap 17 to sensing probe 18 is one foot, for example, then the number of pulses received per second indicates directly the number of feet per second which the object is traveling.

The number of pulses per second received or frequency may, of course, be transmitted over a conductor 105 either by a continuous conductor or by radiation to any point as desired for telemetric indication.

Spurious pulses may occur across the spark gap as a result of transients or harmonics in the system resulting in a false speed indication. Once such a spurious pulse has occurred and has produced an indication, it triggers a further spark which is detected and produces a still further spark. This is self-perpetuating and produces a greater frequency of sparks than that determined by the speed of the body alone. Consequently, the harmonic eliminator is provided as part of apparatus 102. Power is supplied to the various units as shown from a power supply 106.

Inasmuch as detector and shaper amplifiers 23 and 24 are identical with the ones already described, Fig. 4 may be considered in connection with Fig. 11 which is a composite circuit diagram for spark selector and harmonic eliminator 102 and spark source 101.

Sparks across gap 17 of Fig. 9 are produced through the use of a transformer 95 of Fig. 11 by the discharge of a condenser in a manner described in connection with the previous embodiment. However, since with the instant embodiment the number of impulses per second received corresponds to the number of feet per second traveled, it is evident that a large number of discharges per second must be available. For example, if an airplane is traveling 5,600 ft. per second, 5,600 impulses per second must be obtained. A single gas tube of the type 2D21 does not operate reliably with more than 1,400 impulses per second, and thus a series of four tubes are needed operating in succession to obtain the necessary number of impulses. Thus in the circuit of Fig. 11 there are in essence a series of four independent sparking circuits.

As has already been indicated, the cathode follower circuit including tube 45 of the shaper amplifier is necessary as an impedance matching device whenever a cable 61 is used for connecting the separately constructed and spaced apart shaper amplifier and indicator units, whether the indicator is of the synchroscope type or some other type. Assuming that the spark selector and harmonic eliminator are constructed in the same unit as the shaper amplifier, the conductor 96 may be connected directly to terminal 107 which is the input to the spark selector and harmonic eliminator. This is the construction which will be described in detail.

It will be understood, however, that if the units are constructed separately and the cathode follower amplifier 45 is needed for impedance matching, a second amplifier must be used before feeding into the terminal 107, such an amplifier, for example, being substantially identical with the tube 63 as described in connection with Fig. 6.

Referring particularly to Fig. 11, tubes 108 and 109 which may be pentodes of types 6AK6 (miniature tubes) are connected as a triggering circuit for producing sharp pulses. As shown, the plates of the tubes are connected through 50K resistors R81 and R82 to a positive 270 volts D. C., the plates and screen grids being cross connected. Grid bias is supplied to tube 108 through a 1K resistor R83, a varying amount of which is tapped off and conducted through a 250K resistor R84 to the control grid. A 100 mf. blocking condenser C36 is connected between the cathode of tube 108 and R84 as shown.

The plate of tube 109 is connected through a condenser C37 of 25 micromicrofarads to the control grid of tube 110 which acts as a buffer amplifier between the trigger circuit and the following circuit elements to be described. Tube 110 may also be a pentode of the type 6AK6 and has its screen grid connected through a 25K resistor R85 to positive 270 volts D. C. and also through an 8 mf. condenser C38 to ground. The control grid is connected through a 50K resistor R86 to the filaments and to a bias voltage of minus 8 volts D. C. Connected in the plate circuit of tube 110 is a 1K resistor R87, the voltage across which is applied between the filaments and control grids of tubes 111, 112, 113 and 114 for controlling the bias thereon.

Tubes 111, 112, 113 and 114 are connected for firing in succession and are connected in what may be termed a ring circuit inasmuch as the filaments are all connected together and the plates are all connected through 50K resistors R88, R89, R90 and R91 to a positive 270 volts D. C. The plates are connected to each other through 250K resistors R92, R93, R94 and R95. The plates of the tubes are connected respectively to the suppressor grids of succeeding tubes through 25 mf. condensers C39, C40, C41 and C42, each suppressor grid being also connected to the common filament circuit by 100K resistors R96, R97, R98 and R99. The screen grids of tubes 113, 114, 111 and 112 are connected respectively to the control grids of tubes 115, 116, 117 and 118 through 1M resistors R100, R101, R102 and R103 respectively and through .01 mf. condensers C43, C44, C45 and C46 respectively.

Associated respectively with tubes 115, 116, 117 and 118 are gas type tubes 119, 121, 122, and 123 which in turn are associated respectively with .05 mf. condensers C47, C48, C49 and C50 for discharge through the primary of transformer 95. The associated tubes form individual firing circuits and control circuits therefor in order that the four condensers may discharge successively through the primary of the transformer and thus produce four times as many sparks as an individual circuit alone would produce.

With tubes 111, 112, 113 and 114, which may be pentodes of type 6AK6 connected in a ring circuit as shown, it is not always possible to tell which of the tubes will fire first when operation is started by closing the plate circuits. In the circuit as set out, it is assumed that tube 113 conducts first and causes tube 115 to supply a control impulse to tube 119, this being accomplished with the first impulse supplied from shaper amplifier (Fig. 4) and occasioned by the detection of the first ion charge. Detection of the second ion charge causes a second pulse to be provided through tube 110 to the ring circuit whereupon tube 114 supplies a pulse thereby causing tube 121 to become conducting for producing a second spark at gap 117. The two succeeding pulses coming through the shaper amplifier cause tubes 111 and 112 to supply pulses whereby tubes 122 and 123 become conducting and cause sparks to jump across gap 17.

Tubes 115, 116, 117 and 118 may be of the double triode type 6J6 of which one-half may be used and form buffer or isolation amplifiers between the tubes of the ring circuit and the succeeding gas tubes. When the gas tubes become conducting, grid current flows in each and such grid current would place a load upon the ring circuit, thereby affecting its operation. The buffer amplifiers effectively prevent this from occurring.

The plates of tubes 115, 116, 117 and 118 are connected respectively through 250K resistors R104, R105, R106 and R107 to a positive 300 volt D. C. supply. The filaments thereof are connected to the grounded shield of shielded cables and the center conductors form the connections from the various tubes of the ring circuit. The grids of each tube in the buffer amplifier are connected to ground also through 1M resistors. The plates of tubes 115, 116, 117 and 118 are connected to the control grids of tubes 119, 121, 122 and 123 respectively through condensers C51, C52, C53 and C54 of 25 micromicrofarads each, and 100K resistors R108, R109, R110 and R111.

The filaments of tubes 119, 121, 122 and 123 and the screen grids thereof are connected together and to ground, and the plates are connected through 20K resistors R12, R113, R114 and R115 to a positive voltage of 600 volts D. C. through a switch 124. Control grid bias voltage is supplied from a minus 10 volt source as shown through 47K resistors R116, R117, R118 and R119. With 600 volts applied to the tubes 119, 121, 122 and 123, none of these tubes conduct by virtue of the bias supplied thereto until an impulse is supplied to the control grid from the preceding amplifiers.

C47 is charged from the 600 volt source through resistor R112, conductor 125, and the primary 126 of transformer 95, condensers C48, C49 and C50 being charged through the same circuit. When an impulse is placed upon control grid of tube 119 through amplifier 115, tube 119 suddenly becomes conducting and C47 discharges very rapidly through a circuit including the plate cathode of tube 119, conductor 126 to ground, and conductor 125 through the primary winding 126 to ground. Accordingly, a very high voltage of less than one microsecond duration is produced across spark gap 17. As the discharge takes place, the plate voltage of tube 119 drops way down and since R112 is present, the tube becomes non-conducting, whereupon C47 charges for a repeat operation. In entirely the same fashion, condensers C48, C49 and C50 are charged up and discharged in succession, thereby producing a series of sparks across gap 17.

Tubes 119, 121, 122 and 123 may be of the type known as 2D21, each one of which is capable of approximately 1,400 sparks per second with consistent operation so that with four such tubes approximately 5,600 sparks per second may be obtained. Filament voltages for the various tubes of Fig. 11 may be supplied from the available power supply as is well understood.

Figure 10:
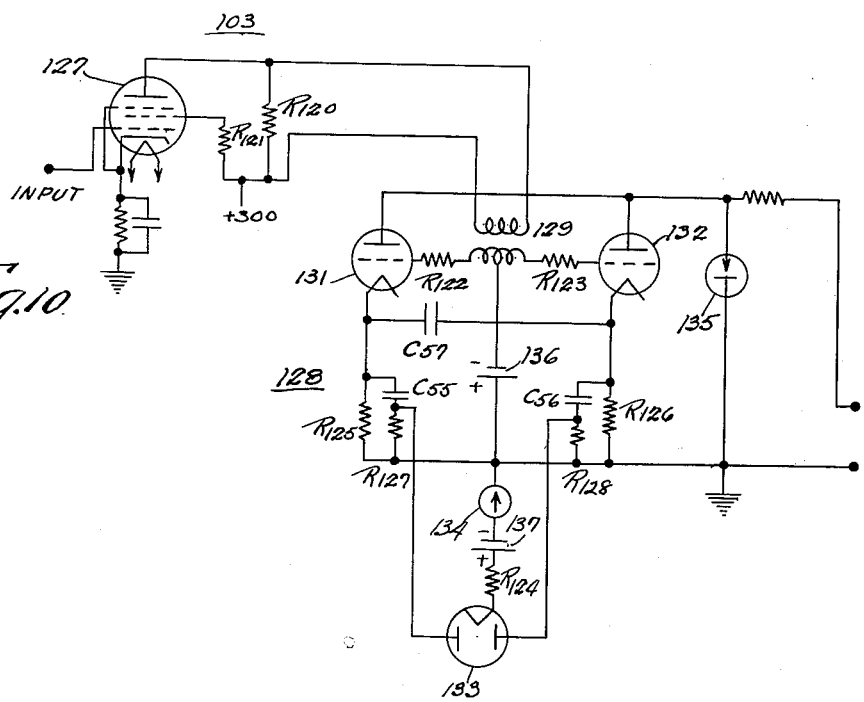
Fig. 10 is a wiring diagram of the indicator of Fig. 9.

The impulses which are detected as the body moves through the air are supplied to the indicator 103 (Fig. 9) this functioning being best visualized by considering Figs. 4, 9 and 10. It having been assumed in this connection that the grid follower amplifier 45 is lacking, since the units are constructed together, conductor 96 is connected to the input of an amplifier 127 which may be substantially identical with amplifier 63 shown in Fig. 6. Amplifier 127 operates as an isolating amplifier to prevent the frequency measuring circuit 128 from placing a load upon the shaper amplifier. Tube 127 may be a pentode of the type 6AC7 with a positive voltage of 300 volts D. C. applied to its plate through 100K resistor R120, the screen grid thereof being connected through a 470K resistor R121 also to a positive 300 volts.

The output of amplifier 127 is connected through a transformer 129 to the grids of tubes 131 and 132 through 15K resistors R122 and R123. Tubes 131 and 132 are gas type triodes connected in an inverter circuit so that condensers C55 and C56 are alternately charged from the supply voltage S on the positive and negative halves of the cycle. A definite fraction of this current flows through the double triode tube 133 and the frequency meter 134 which accordingly gives a deflection proportional to frequency. A voltage regulator tube 135 of type 874 may be used to stabilize the supply voltage. Battery 136 may have a value of 9 volts with polarity as shown, and battery 137 may have a voltage of 1½ volts with polarity as shown and a resistor R124 may be chosen of any value so that the reading microammeter 134 will appear on the scale. Condenser C57 may have a value of .002 mf. and filament resistors R125 and R126 may have equal values of 3K, as may have resistors R127 and R128.

Frequency measuring circuits of the type shown and described in Fig. 10 are well known and it is not believed necessary to further set out its operation.

Considering Figs. 4, 9, 10 and 11 together, the integrated operation of this embodiment of the invention may be understood.

Whenever an impulse is received by detector 18, a spark is initiated at gap 17, and when the ion charge left by this spark is detected by probe 18 a second spark is initiated. Each charge detected produces an impulse which is supplied to the frequency measuring circuit and thus an indication of the number of impulses per second is obtained and consequently of the speed of movement.

In circuits where the shaper amplifier and the frequency indicator are separated from each other so that a coaxial cable may be used, as in connection with Figs. 4 and 6, the buffer amplifier 45 must be used, as must also an amplifier corresponding to either amplifier 63 and 127 at the input to tube 108 to obtain the impedance matching necessary, as is well understood.

To prevent spurious impulses from causing the frequency indication to be erroneous, the rotating contact switch 124 (Fig. 11) is connected in the plate supply circuit of tubes 119, 121, 122 and 123. The rotating switch being driven by any suitable means, such for example as a small motor 137 supplied with power from any of the power sources available, the plate circuit of the firing tubes is periodically interrupted and the sparks supplied are interrupted at periodic intervals. Such interruptions may vary and, for example, may occur as frequently as 100 times per second without interfering with the frequency indicating operation. Other harmonic suppressor circuits may of course be used.

To prevent transients in the transformer circuit from causing spurious sparks, a resistor 138 is connected across the primary thereof to form a damping circuit for such transients.

In place of meter 134 in Fig. 10 or in conjunction therewith, the signals may be transmitted for telemetric purposes.

In this embodiment also, other tubes, constants and circuit arrangements may be used without departing from the scope of the invention.

The boom 16 may house as many of the tubes and circuits as can be placed therein. Using miniature and acorn type tubes and printed circuits, conveniently compact and efficient arrangements may be made.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. Apparatus for measuring the velocity of a body moving in a medium relative to that medium comprising, means for creating a static electric pulse of short time duration in said medium from a certain point on said body, detector means on said body spaced a predetermined distance from said certain point for detecting the electromagnetic radiation from said pulse substantially at the instant of creation and for detecting the effect of said pulse in said medium as said detector moves thereby, amplifying means connected to said detector means and capable of amplifying an effect created at said detector means by the reception of said radiation and an effect created at said detector means by the movement thereby of said pulse created effect in the medium, and means electrically connected to said amplifying means for indicating the time interval between the detection of said radiation and the detection of the presence of said pulse created effect in the medium.

2. Apparatus for measuring the velocity of a body moving in air relative to air comprising, means for creating a spark at a certain point on said body, detector means on said body a certain distance from said certain point, signal amplifier means electrically connected to said detector means, said detector means detecting a spark substantially at creation thereof by a radiation signal therefrom and detecting the presence of ions from said spark by an induction signal therefrom at the point of spark occurrence as said detector means moves thereby, said signal amplifier means being capable of amplifying an effect created at said detector means by the reception of said radiation and the effect created at said detector means by said induction signal, and means receiving said signals from said amplifier and indicating the time interval therebetween.

3. Apparatus for measuring the velocity of a body moving in air relative to air comprising, means for creating a spark at a certain point on said body, detector means on said body a predetermined distance from said certain point, signal amplifier means electrically connected to said detector means, said detector means detecting a spark substantially at creation thereof by a radiation signal therefrom and detecting the presence of ions by an induction signal therefrom at the point of spark occurrence as said detector moves thereby, said signal amplifier means being capable of amplifying an effect created at said detector means by the reception of said radiation and the effect created at said detector means by said induction signal, a cathode ray and sensitive screen indicating means, oscillation generating means for supplying a time base frequency to said indicating means, and means for supplying said signals from said amplifier to said indicating means whereby said signals appear as spaced pulses on said sensitive screen.

JAMES ROBERT DOWNING.

REFERENCES CITED

The following references are of record in the file of this patent:

UNITED STATES PATENTS

| Number | Name | Date |
|---|---|---|
| 1,611,502 | Allen | Dec. 21, 1926 |
| 1,616,481 | Allen | Feb. 8, 1927 |
| 1,808,709 | Blake | June 2, 1931 |
| 2,178,074 | Jakel et al. | Oct. 31, 1939 |
| 2,259,904 | McNamee et al. | Oct. 21, 1941 |
| 2,370,134 | Begun | Feb. 27, 1945 |
| 2,569,974 | Campbell | Oct. 2, 1951 |